Aug. 6, 1957  L. E. DENNING ET AL  2,802,095
CHRISTMAS TREE LIGHTING BRACKET
Filed Sept. 27, 1955

LEO E. DENNING
VERNON R. PRING
INVENTORS

BY
ATTORNEY

United States Patent Office 2,802,095
Patented Aug. 6, 1957

2,802,095

CHRISTMAS TREE LIGHTING BRACKET

Leo E. Denning, Monterey Park, and Vernon R. Pring, Covina, Calif.

Application September 27, 1955, Serial No. 536,868

4 Claims. (Cl. 240—10)

The present invention relates to Christmas tree decorations in general and in particular to a Christmas tree light-mounting unit. More specifically the invention comprises a Christmas tree lighting bracket unit which is characterized in that it carries a plurality of spaced electrically connected light bulbs and also includes means to aid in the desired alignment of the limbs of a Christmas tree upon which it is positioned.

In the decoration of the usual Christmas tree, there are two very common problems. The Christmas tree lights must be attractively positioned and in addition the limbs of the tree must be adjusted and held in the proper angular relationships. Frequently the limbs of a tree are bent at various angles relative to the central trunk and can only be retained at a desirable common angularity by external means. The positioning of the lights on the various limbs is a problem which requires considerable skill and ingenuity if the result is not to be a conglomeration of interconnecting wires which are in no way additive to the beauty of the tree.

The Christmas tree lighting brackets constructed in accordance with the present invention perform the functions of positioning light bulbs relative to the tree, of maintaining the angular relationship of the limbs to the tree, and also of providing a stiffening effect for the limbs upon which the brackets are mounted. Each bracket incorporates current-carrying means by which electrical current is conducted to spaced bulbs and is sufficiently strong and rigid as to maintain the branch to which it is attached in a proper position.

Referring now to the drawing in which preferred embodiments of the present invention are illustrated:

Figure 1:
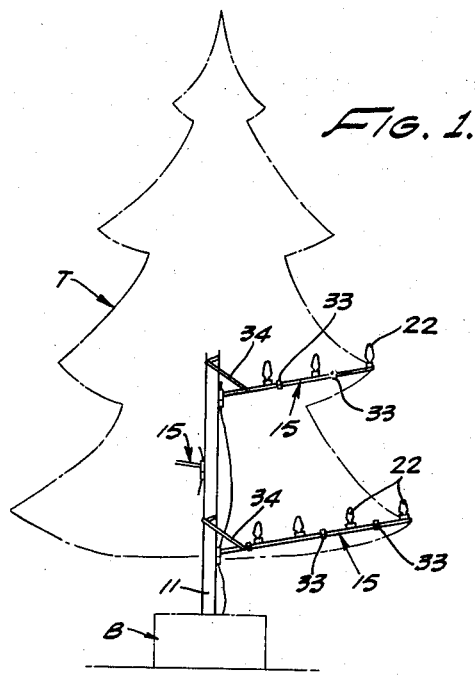
Figure 1 is a diagrammatic showing of a Christmas tree embodying lighting brackets constructed in accordance with the present invention.

Referring again to the drawing, a Christmas tree is indicated generally by the reference character T and is seen to be supported upon a suitable base B and to include a central trunk 11 which extends substantially vertically and from which in a common and well known manner there extend outwardly a plurality of branches 12. Branches 12 in turn carry still smaller branches or boughs 13 upon which needles characteristic of Christmas trees grow and which give to the tree its attractive appearance. The various limbs 12 are spaced differently upon the central trunk 11 of different trees but they naturally extend outwardly at a slight upward inclination, in the manner illustrated in Figure 2. However in shipping the tree from the forest to the market and for purposes of reducing the space required, such trees are commonly tied with the branches 12 pulled in toward the trunk 11 and secured. The bulk of the tree is thus materially reduced but unfortunately after being so tied for a period of time, the branches 12 tend to remain in the tied unnatural positions in which they render the tree as a whole much less attractive. When decorating the tree the owner will pull these branches 12 downwardly into desired positions and, where necessary, secure them as by suitable weighted objects preferably decorative in appearance.

According to the present invention, a lighting bracket unit, indicated generally by the reference character 15, is secured to a limb 12 and functions not only to provide rigidity to maintain the latter in alignment but also to provide decorative lights along its length. Bracket unit 15 comprises an elongated shaft-like body or arm 16 preferably formed of metal or a relatively rigid plastic having the requisite strength for the purpose to be performed. Body 16 may be round or may have any other desired cross-sectional shape, and is preferably formed with longitudinally extending grooves or channels 17 in its upper side which seat the insulated current-carrying conductors 18. At spaced intervals along the length of the body 16 are mounted bulb-carrying sockets 19 of conventional construction which include connectors 21 in electrical contact with the conductors 18 and which removably seat light bulbs 22.

Bracket body or shaft 16 is enclosed for its full length, except immediately adjacent the sockets 19, by an insulation covering or wrapping 23 having insulating characteristics. Covering 23 retains the conductors 18 in their seating grooves 17 and also protects them from wear and abrasion. Common insulation tape is suitable for the wrapping or a one-piece enclosing rubber or rubber-like coating can be used.

Figure 4:
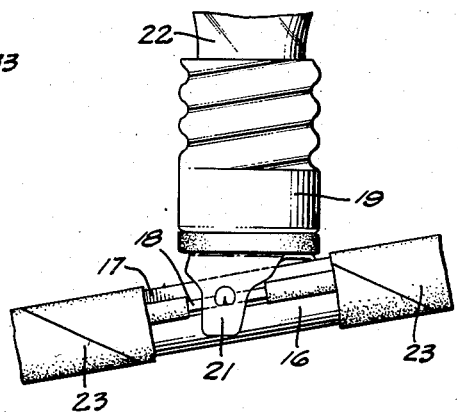
Figure 4 is an enlarged showing of one of the bulb sockets carried by the bracket arm and of one of the connected current-carrying conductors which extend therealong, the protective wrapping being removed.

Coating 23 ends immediately adjacent opposite sides of the light sockets 19, each socket being protected by its own insulation wrapping 24 which encircles not only the adjacent portion of bracket body 16 but also the exterior of the socket 19 itself. Socket 19 is illustrated exposed in Figure 4 and with the protective wrapping 24 in place in Figure 2.

At its inner end the bracket unit 15 is provided with an electrical connector member 26 and with a lead or current-conducting cord 27 which at its opposite end carries a second connector 28. Connector 26 is adapted to receive current from a conductor 29 having a connector 31. Lead 27 and connector 28, on the other hand, are adapted to conduct current to a second bracket unit 15 positioned upon an adjacent branch higher on the tree.

Figure 3:
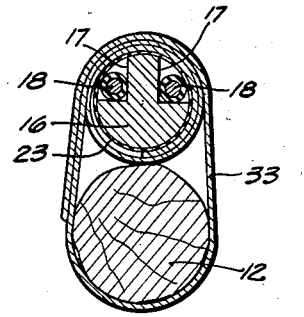
Figure 3 is a section upon the line 3—3 of Figure 2 and illustrates the means by which the bracket shaft or arm is connected to the branch.

At spaced intervals along its length bracket 15 is provided with flexible metal straps 33. Each of these straps is connected to the body 16 of the bracket by being wound several times therearound and includes an extended length sufficiently long to enable it to be wound about the adjacent branch 12 and then again around the body 16 in the manner shown clearly in Figure 3. This draws the branch 12 and the body 16 together and causes the former to conform to the configuration of the latter.

Figure 2:
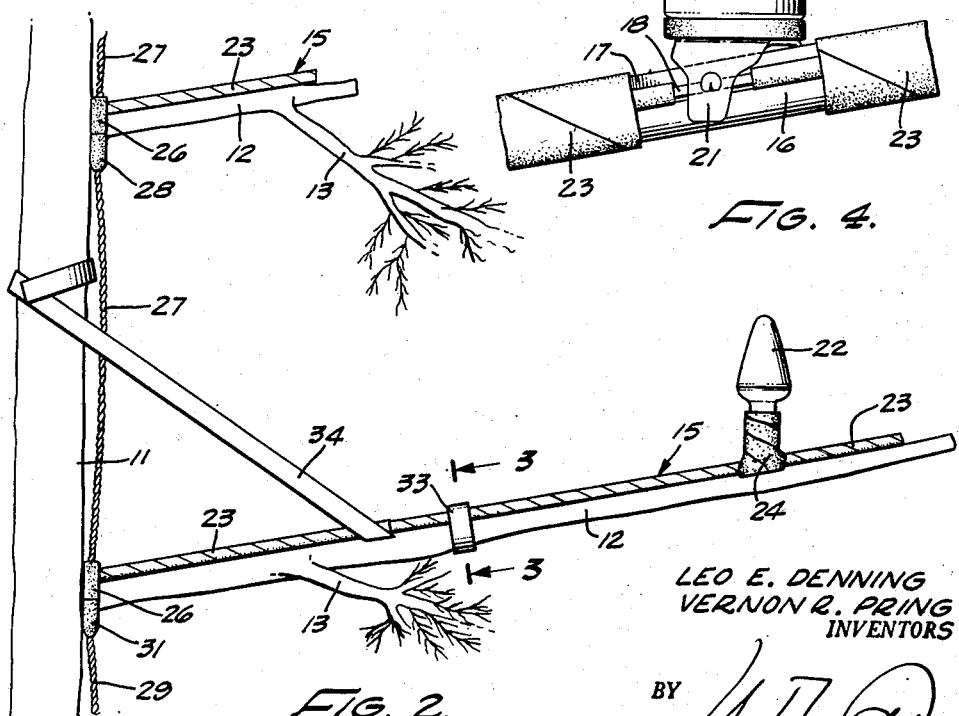
Figure 2 is an enlarged showing of the connection of one of the lighting brackets to the tree shaft or trunk.

Near its inner end, there is the end which carries the electrical connector members 26 and 28 and the lead 27, bracket 15 carries a connector strap 34 which is substantially identical to the connector straps 33 with the exception that it is much greater in length and so is adapted to extend from the unit 15 at an angle toward and around the trunk 11, as illustrated in Figure 2. In those instances in which the limb 12 needs to be tilted upwardly, it is possible by drawing the strap 34 tightly around the trunk 11 at a point higher than the limb to lift it upwardly. Also, if desired, by extending the strap 34 downwardly rather than upwardly the branch can be pulled downwardly.

The installation and operation of the Christmas tree lighting bracket constructed in accordance with the present invention is believed to be clear from the foregoing. The unit 15 with the bulbs 22 in place in their sockets 19 is positioned upon a limb 12 and attached thereto by wrapping the flexible metal straps 33 around the limb and drawing the limb and the bracket body 16 together. The electrical connector member 26 at the inner end of the bracket unit is then connected to a source of current and, if it is desired to vary the angularity of the limb, the elongated strap 34 is connected to the trunk 11 either above or below the limb 12 and drawn taut. If there are upper limbs above the limb to which the first-mentioned bracket 15 has been connected, then brackets will be similarly positioned upon them, current being conducted from a lower bracket to a higher bracket through the lead 27 and the engagement of connectors 26 and 28 in each instance.

In certain instances it may be that the bracket unit 15 will be longer than a limb. In such cases it is entirely feasible to extend the inner end of the bracket 15 past the trunk simply by flexing the body 16 to one side of the trunk. The bracket so connected functions in other respects as when connected as described.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A Christmas tree decorative device adapted to extend along and to be secured to the branch of a tree to reinforce the branch, to support the same in a desired angular position relative to the tree trunk, and to support electric bulbs in desired spaced-apart positions along the branch, said device comprising a relatively rigid elongated body having conductor wires extending therealong, a plurality of lamps mounted in spaced relation along said body and extending therefrom in a predetermined direction, adjustable clip means spaced along said body for clipping a branch firmly against said body thereby reinforcing said branch, and separable connector means at one end of said body for readily connecting said device in circuit with a service cord receptacle.

2. A decorative device as defined in claim 1 including a tension member having one end connectible to said body member intermediate its end and its other end being adapted for connection to the tree trunk at a point above the branch to which said device is clipped, said tension member being adjustable as it is connected to the tree trunk to support said device and an associated branch in a desired angular position relative to the tree trunk.

3. An article of manufacture for use in reshaping and reinforcing the branches of a Christmas tree while supporting light bulbs in predetermined positions thereon, said article comprising an elongated relatively rigid member incorporating a pair of electrical wires therealong connected to spaced-apart bulb sockets, readily bendable clipping strips distributed along said member for clamping said member firmly against one side of a tree branch, a relatively long clipping strip having a free end for connection to the tree trunk or the like to further steady the first mentioned tree branch and a separable connector member fixed to one end of said rigid member for readily connecting the same in circuit with an electric service cord.

4. An article of manufacture as defined in claim 3 including a plurality of said relatively rigid, light bulb supporting members having a short length of a service cord attached to one end of each thereof, each rigid member being adapted to be connected to a different tree branch and in circuit with one another, and each of said relatively long strips being adapted for supporting connection to a higher portion of the tree in such manner as to support said reinforced tree branches in a predetermined angular position relative to one another.

References Cited in the file of this patent

UNITED STATES PATENTS

| | | |
|---|---|---|
| 2,131,671 | Reed | Sept. 27, 1938 |
| 2,298,089 | Veenboer | Oct. 6, 1942 |
| 2,559,706 | Brooks | July 10, 1951 |
| 2,572,382 | Peterson | Oct. 23, 1951 |